Patented Sept. 4, 1951

2,566,364

UNITED STATES PATENT OFFICE 2,566,364

METHOD FOR PREPARING ORGANIC POLYSILICATES STABLE AGAINST HYDROLYSIS

George Wesley Pedlow, Jr., Easton, Pa., and Carl Shelley Miner, Jr., Winnetka, Ill., assignors to Minnesota Mining & Manufacturing Company, St. Paul, Minn., a corporation of Delaware No Drawing. Application June 15, 1946,
Serial No. 677,097

3 Claims. (Cl. 260—2)

This invention relates to organic silicon compounds which are resistant to hydrolysis, and which are of the nature of tertiary-carbinyl polysilicates or tertiary-carbinoxy polysiloxanes. While the tertiary-carbinoxy polysiloxanes in general are contemplated, the invention is particularly concerned with the resinous polymers and methods for their preparation.

This application is a continuation-in-part of our copending application Serial No. 470,904, filed December 31, 1942.

Certain liquid or resinous organic polysilicates have previously been prepared, e. g. by partial hydrolysis under special conditions of methyl or ethyl orthosilicate, and have been suggested for use in conjunction with, or as a part of certain paints; and also in connection with certain vinyl resins: see U. S. Patent No. 2,317,891 to Brook J. Dennison. These prior art organic polysilicates have been found to be highly susceptible to hydrolysis, a difficulty which might be anticipated from the method of preparation employed involving hydrolysis of only 1, 2 or 3 (less than all) of the identical organic groups of the original orthosilicate. In many cases, the usefulness of these prior art materials has, indeed, been dependent on their ability to hydrolyze to $SiO_2$.

It is an object of the present invention to provide a new class of organic polysilicates which are stable toward hydrolysis, particularly under neutral or alkaline conditions, and to provide a method for the preparation thereof. A specific object is the preparation of silicon-containing resinous materials which are useful in the presence of moisture. Another object is the provision of a new class of organic polysilicates. A related object is the production of organic polysilicates which have new utility because of their new characteristics over prior art polysilicates. These and other objects and advantages will appear from the specification taken as a whole.

Previously known organic silicon compounds in which primary alkoxy, or other carbinoxy groups were attached to silicon were in general found to be highly susceptible to hydrolysis and removal of the carbinoxy group. We have found that compounds in which a tertiary carbon atom is bonded through an oxygen atom to silicon are surprisingly resistant to hydrolysis, and that such compounds may be employed in the preparation of our organic polysilicates, which have new and useful properties. We have found this to be true even with polysilicates containing other organic groups in addition to tertiary-carbinoxy groups. Our presently preferred products, however, are prepared from organic silicon compounds containing at least as many tertiary-carbinoxy groups as non-tertiary groups, and which may contain exclusively tertiary-carbinoxy groups as the organic portion of the molecule. Specific examples of preferred materials are the resinous products obtained, by methods hereinafter to be described, from di-tertiary-butoxydichlorosilane or from a mixture of di-tertiary-butoxydichlorosilane and tertiary-butoxytrichlorosilane.

The tertiary-carbinoxy halosilanes, of which two examples have just been named, are conveniently employed as intermediates in the preparation of our novel polysilicates. These intermediate compounds may readily be prepared by methods described in our copending application Serial No. 667,596, filed May 6, 1946, to which reference is here made both for methods of preparation and for the specific compounds and classes of compounds there disclosed. For example, di-t-butoxydichlorosilane may be prepared by the reaction, in the presence of an acid acceptor (for the HCl produced) such as pyridine, of two mols of tertiary-butyl alcohol with one mol of silicon tetrachloride. Compounds thus formed can be hydrolyzed under controlled alkaline conditions, e. g. in the presence of aqueous ammonia or aqueous pyridine, to remove the hydrolyzable halogen atoms and to yield a tertiary-carbinoxy silane type of compound which latter is resistant to neutral or alkaline hydrolysis and which may be further reacted to a viscous or resinous state. The silane type of compound produced by the hydrolysis of a di-t-carbinoxydichlorosilane, for example, may be a di-t-carbinoxydihydroxysilane such as [(CH$_3$)$_3$CO]$_2$Si(OH)$_2$ or some variation thereof. In some cases said compound, depending on the manner of hydrolysis, may have a molecular formula of generally the following type:

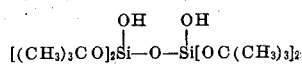

Whatever the exact molecular structure may be, these products of the hydrolysis of the t-carbinoxy halosilanes contain t-carbinoxy groups but no halogen atoms attached to silicon, and are resistant to both neutral and alkaline hydrolysis. Compounds of this character may be condensed (polymerized) to form organic-silicon resins which may be controlled to a clear, colorless, water-resistant fusible character as hereinafter indicated, and by a mechanism which appears to involve elimination of both water and alcohol.

One method for the preparation of our novel polysilicates, involving hydrolysis of a t-carbinoxy halosilane and heating of the resulting product, will now be described. (These materials are here classified for convenience as polysilicates; it will be understood, however, that in many instances the exact structure and formula of the compounds concerned is uncertain.)

Example 1

In a suitable reaction vessel is placed 150 parts by weight of concentrated aqueous ammonia. The ammonia solution is cooled to 15–20° C., and with good agitation 68 parts of distilled di-t-amoxydichlorosilane, which boils at 105° C. at a pressure of 22 mm. of mercury, is gradually added over a 30 minute period keeping the temperature at 15–20° C. Agitation is continued for 15 minutes. The layers which have formed are separated and the aqueous layer extracted with benzene, which is then added to the oil layer. The benzene solution of the product is filtered to remove traces of solid impurities. The filtrate is then distilled at atmospheric pressure until all of the benzene is removed. The product is then heated, the time and temperature of the heating being determined by the properties desired in the final resinous product, which may vary from a viscous oil through a soft, tacky resin to a hard and brittle resin which may be either fusible or infusible. For example, the product of the above reaction was heated at atmospheric pressure at 245–55° C. for 30 minutes and then at the same temperature at 30 mm. pressure for 1 hour. At the end of this treatment the product (37.4 parts by weight) was still fluid before cooling, but at room temperature it was a clear, almost colorless, hard and brittle resin. Analysis of this sample gave a value for silicon of 18.5%. The resin was insoluble in water, and not affected by prolonged contact therewith.

The conditions of time and temperature in the hydrolysis of the di-tert-amoxy dichloro silicane may be varied greatly from those indicated in the preceding example. For example, such a hydrolysis has been successfully carried out at 70° C. The time in any case need only be sufficient to assure completion of the hydrolysis which occurs much more rapidly as the temperature is increased.

Resins of the type herein indicated may also be prepared by an indirect procedure involving the conversion of a di-tert-alkoxy dichloro silicane to a di-tert-alkoxy diamino silicane by reaction of the former with anhydrous ammonia. The di-tert-alkoxy diamino silicane may be hydrolyzed by water alone. The product is then separated and heated as in the preceding example.

Tertiary-carbinoxy trichlorosilanes are even more readily converted to resins than the di-t-carbinoxy dichlorosilanes. The following example demonstrates the preparation of resinous materials from t-butoxytrichlorosilane.

Example 2

Thirty (30) parts by weight of t-butoxytrichlorosilane is dissolved in an equal volume of pyridine. The mixture is maintained at 15–20° C. while water is added in small portions (dropwise where the parts by weight are in grams) with continuous agitation until the pyridine hydrochloride precipitate, which first forms, starts to dissolve. Excess water is then added, causing the separation of an oily layer. The mixture is extracted with petroleum ether, the extract washed to remove most of the pyridine and dried with anhydrous sodium sulfate, the ether evaporated, and the residue heated to 100° C. at 3 mm. pressure for 15 minutes to remove residual pyridine and any other volatile materials. In a typical run, there was obtained a soft thermoplastic resin containing 20.7% Si, corresponding closely to the formula $[(CH_3)_3COSiO(OH)]_n$.

Small (two gram) portions of the product obtained as above were heated under an air-cooled reflux for various times and at various temperatures. The following results were obtained:

| Temp., °C. | Time | Product | |
|---|---|---|---|
| | | Per Cent Si | Physical state |
| 125–130 | 10 hrs. | 22 | brittle resin, soluble in benzene. |
| 125–130 | 20 hrs. | 24 | very brittle resin, soluble in benzene. |
| 300–340 | 7 min. | 28 | very brittle resin, insoluble in benzene. |

These resins were found to be stable toward hydrolysis.

Other generally parallel reactions and parallel types of products may be prepared by starting with a different specific tertiary-carbinoxy chlorosilane, and a whole series of such resins may be produced. These resins, when produced under moderate heating conditions, are thermoplastic and are soluble in common organic solvents, e. g. benzene, ethyl alcohol, petroleum ether, etc. However upon long heating, or heating for a shorter time at appreciably higher temperatures, these resins ultimately become infusible and also insoluble, as indicated under Example 2 above. The resins are insoluble in and unaffected by water whether in the thermoplastic or the infusible state.

Tertiary-butoxytrichlorosilane, t-amoxytrichlorosilane, di-t-butoxydichlorosilane, di-t-amoxydichlorosilane, bis(t-dichlorobutoxy) dichlorosilane, and sym-tetra-t-butoxydichlorodisiloxane are representative of other tertiary-carbinoxy halosilanes and analogous compounds from which we have made our novel resinous polysilicates according to the procedure of Example 2.

Compounds such as sec-butoxy-t-butoxydichlorosilane, n-butoxy - t - butoxydichlorosilane, ethoxy - t - butoxydichlorosilane, methoxy-t-dichlorobutoxydichlorosilane, methoxy - t-amoxydichlorosilane, ethyl-t-amoxydichlorosilane, and analogous compounds may also be converted to polysilicates, by methods similar to those previously outlined or by modifications thereof. One such modification will now be described by reference to the preparation of a resinous material from methoxy-t-butoxydichlorosilane.

Example 3

A. Methoxy - t - butoxydichlorosilane, in solution in ether, was added slowly to an ice-cold mixture containing ether, water, and slightly more than the theoretical quantity of pyridine (based on two mols of pyridine for each mol of the dichlorosilane). After hydrolysis the mixture was extracted with ether, evaporation of which left a viscous, cloudy liquid which remained cloudy after filtration. On standing at room temperature for two days the liquid product set to a soft, infusible, insoluble gel. Slight heating reduced the gelling time to a few hours. For example, a soft gel was obtained by heating the liquid hydrolysis product for 2.5 hours at 50–65° C. or one hour at 100° C. Additional heating of the gel-like products resulted in a hard, infusible, non-hydrolyzable resin which was somewhat brittle but had improved toughness over the products obtained from t-butoxydichlorosilane, described under Example 2.

B. Methoxy-t-butoxydichlorosilane may also be converted to a resinous polysilicate by the procedure outlined in Example 2, including adding water in small portions to a pyridine solution of the methoxy - t - butoxydichlorosilane, isolating the resulting liquid hydrolysis product, and heating at relatively high temperatures. In a typical example, 70% of the hydrolysis product distilled at 150-220° C. at 10 mm. of mercury; when this portion was heated from 250° to 350° in 30 minutes and held for 15 minutes at the latter temperature, a soft resin was obtained. Continued heating converted the soft resin into a brittle infusible product.

The soft resin of part B is a soluble, fusible product, and at no point in its production is it in the form of gel. In contrast the hydrolysis product of part A becomes a soft, infusible and insoluble gel in a short time on mild heating and remains insoluble and infusible during the remainder of the treatment. On the other hand, if this same part A hydrolysis product, instead of being allowed to stand at room or slightly elevated temperatures, is immediately heated to a temperature of about 150° C. or higher, it is converted to a soluble, fusible resin indistinguishable from that obtained in part B.

Example 4

A mixture of three mols of methoxy-t-butoxydichlorosilane and one mol of tertiary-butoxytrichlorosilane was hydrolyzed by adding water in small portions to the solution of the mixture in pyridine, as in Example 2. A viscous cloudy liquid was obtained, which on analysis was found to contain 19.2% Si. The liquid set up to a soft brittle gel in 5 hours, and to a brittle resin in 4 days, when held at normal room temperature. The brittle resin contained 25.1% Si. The soft brittle gel could be obtained in 45 minutes at 70-75° C. Heated at higher temperatures, including a final heating at 125° C. for 20 hours, the liquid advanced to a hard resin which contained 31.7% Si.

Example 5

Mixtures of n-butoxy-t-butoxydichlorosilane and t-butoxytrichlorosilane in various proportions were hydrolyzed by dissolving in ether and adding to an ether-water-pyridine mixture as in Example 3. The hydrolysis products were isolated, freed from residual pyridine under high vacuum, and heated at 100° C. in sealed containers until they no longer flowed at that temperature. The resultant soft gels were further heated in the open for 25 hours at 125-130° C. to produce hard resinous materials which were stable against hydrolysis. A sample of n-butoxy-t-butoxydichlorosilane when thus treated yielded a hydrolysis product containing 17.2% Si and requiring 110 hours at 100° for gelation; the final hard resin contained 21.3% Si. A mixture of three mols of n-butoxy-t-butoxydichlorosilane and one mol of t-butoxy-trichlorosilane yielded a hydrolysis product containing 17.8% Si, required 28 hours for gelation, and produced a hard resin containing 22.6% Si. A mixture of the same two compounds in equimolar proportions yielded a hydrolysis product containing 18.6% Si, gelled in 22 hours, and analyzed 23.9% Si when converted to the hard resin.

Since approximately the same final product is obtained in each of the above procedures, the particular mixture to be employed in any particular case may be ascertained on the basis of economy of raw materials or other considerations.

Similarly, mixtures of di-t-butoxydichlorosilane and t-butoxytrichlorosilane were converted to hydrolysis products which when heated formed soft, and ultimately hard and brittle resinous products, in somewhat less time than was required for the development of similar resins from the hydrolysis product obtained from di-t-butoxydichlorosilane alone.

Example 6

As an example of the wide difference in stability toward hydrolysis between tertiary-carbinoxy and non-tertiary-carbinoxy silicon compounds, a comparison was made between di-t-butoxydichlorosilane and di-sec-butoxydichlorosilane, each of which was prepared by reaction between silicon tertra-chloride and the appropriate alcohol in the presence of pyridine as an acid acceptor. Five gram portions of these compounds were separately hydrolyzed by adding dropwise to 20 ml. portions of concentrated aqueous ammonia, yielding viscous resinous products on extraction with petroleum ether and subsequent removal of the solvent, (followed by heating in the case of the tertiary-butoxy compound). Samples of the two resins were coated on glass and immersed in water. The sec-butyl resin became cloudy after 30 minutes and flaked off after 24 hours. The tert-butyl resin under the same conditions was not affected.

Example 7

A mixture of tertiary-carbinoxy chlorosiloxane was prepared by reacting 70.4 parts by weight of tertiary-amyl alcohol with 57 parts of silicon oxychloride in the presence of 63.2 parts of pyridine and 130 parts of benzene. The product boiled at 145-155° C. at 6 mm., and contained 20.8% hydrolyzable chlorine, indicating the probable composition to be approximately 60% tetra-t-amoxydichlorodisiloxane and 40% tri-t-amoxytrichlorodisiloxane. Hydrolysis of 20 parts by weight of this product according to the method described in Example 2 gave 9.2 parts of a high-boiling viscous liquid, resinifiable by heat, and 5.4 parts of a hard brittle resin.

The above example illustrates the application of another class of chlorosilicates to the production of nonhydrolyzable resinous organic polysilicates.

It will be seen from a consideration of the principles exemplified in the above specific examples that the formation of our tertiary-carbinyl polysilicates involves the hydrolysis of a tertiary-carbinoxy halosilane or analogous compound under alkaline conditions, and the condensation of the resulting hydrolysis product to the desired resinous state, involving what we now believe to be the formation of polysilicate or polysiloxane linkages. The products are valuable new compounds or mixtures of compounds having the desirable property of being stable against hydrolysis, such that the physical properties of these products are not altered by prolonged contact with either liquid water or moisture vapor. Such products ordinarily have an average number of tertiary-carbinyl groups per silicon atom of 0.5 to 2, and commonly between 0.5 and 1.5.

While the products of this invention are readily formed in bulk, as indicated in the examples, they may also be produced in the form of thin coatings, in admixture with various modifying or extending agents, or under various other conditions.

The products hereinabove described may be fluid or viscous liquids, crystalline solids, or resins which may be soft and sticky or hard and brittle. The liquids and crystalline solids hereinabove described and derived from the tertiary-carbinoxy halosilanes are useful as plasticizing and compounding agents for natural and/or synthetic resins such as cellulose esters and ethers or the more resinous organic silicon compounds herein described. For example, we have used our polysilicates blended with ethyl cellulose, and the blend was used as a water-repellent and protective coating on paper. They may be used alone or in admixture with other plasticizers known to those familiar with the art. They may be used as ingredients in extreme pressure lubricants and are also applicable as paint media or as ingredients in waxes and polishes. The resinous products are particularly useful as waterproof coatings for wood, metal, paper, etc., either alone or modified with plasticizers or other plastics. They are also useful as ingredients in adhesives, paints and lacquers.

The term "carbinyl" as used herein refers to the organic radical derived from an alcohol by removal of the hydroxyl group, and the term "tertiary-carbinyl" is similarly employed where the alcohol is a tertiary alcohol. The tertiary alcohols may contain such groups as alkyl, chloroalkyl, aryl, aralkyl, or alicyclic groups attached to the carbinol carbon. The term "tertiary-carbinoxy" as herein used is intended to cover the radical derived from any tertiary alcohol by removal of the hydrogen atom from the hydroxyl group attached to the tertiary carbon atom. Analogously, the term "carbinoxy" covers the radical derived from any alcohol by removal of the hydrogen atom from the hydroxyl (alcohol) group.

It is evident that many changes may be made in the processes as given in the above examples, e. g. in quantities of reactants, time and temperature of reaction, etc., without departing from the spirit of the invention. It will also be evident that we have been obliged to resort to specific illustrations of our novel products which, of necessity must be restricted in number. However, it will also be clear in this respect that various other analogous products will readily occur to those skilled in the art in the light of the illustrations and the disclosure given herein. It will therefore be understood that the various illustrations given herein are exemplary only of the broader and more comprehensive phases of this invention and are not to be regarded as limitative. All embodiments within the scope of this disclosure and/or of the appended claims, which distinguish over the prior art, are contemplated.

What we claim is:

1. A process for the manufacture of polymeric esters of silicic acid which comprises reacting a tertiary-carbinoxy polychlorosilane with water in non-acidic medium and applying heat to the hydrolysis product.

2. A process for the manufacture of polymeric esters of silicic acid which includes the step of reacting a tertiary alkoxy polychlorosilane with water in the presence of a basic nitrogen compound as an acid acceptor.

3. A process for the manufacture of polymeric esters of silicic acid which includes the step of reacting a tertiary-carbinoxy polyhalogenosilane with water in non-acidic medium, the halogen atoms being hydrolyzable to produce a silicon compound substantially free of halogen.

GEORGE WESLEY PEDLOW, Jr.
CARL SHELLEY MINER, Jr.

REFERENCES CITED

The following references are of record in the file of this patent:

UNITED STATES PATENTS

| Number | Name | Date |
|---|---|---|
| 2,395,880 | Kirk | Mar. 5, 1946 |
| 2,438,520 | Robie et al. | Mar. 30, 1948 |

OTHER REFERENCES

Backer et al., Receul Travaux Chimiques, vol. 61, 1942, pp. 500 and 511. Published June 1942.